Dec. 25, 1945.   J. D. WALKER   2,391,494
METHOD AND APPARATUS FOR TREATING SEWAGES
Filed Dec. 13, 1939
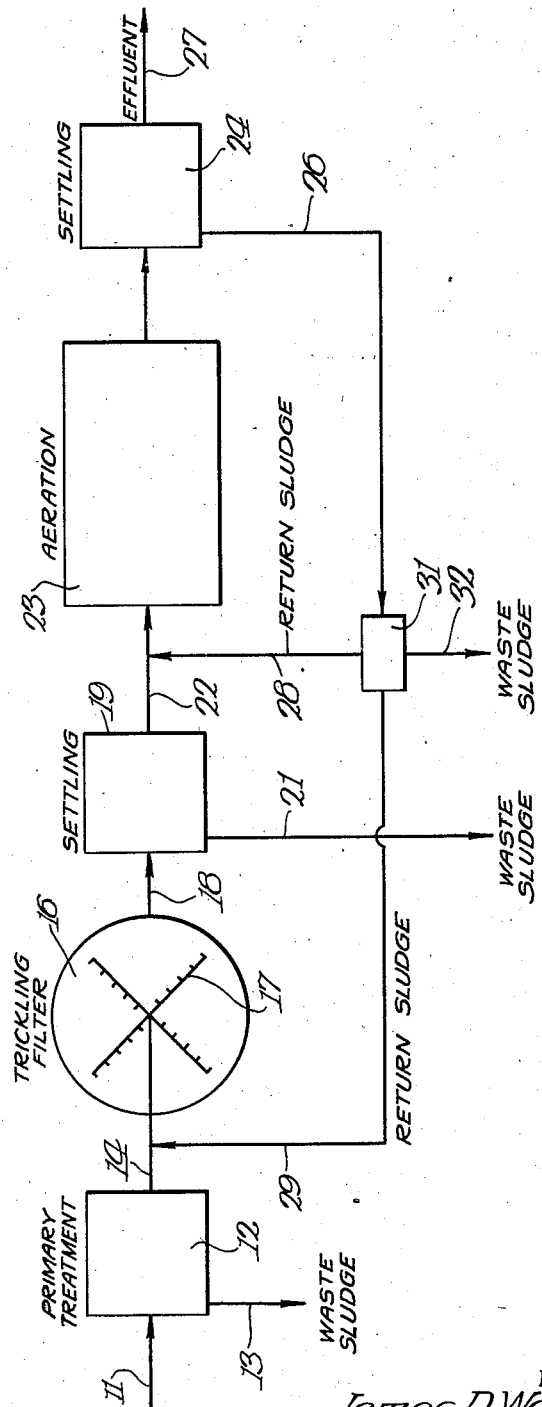
INVENTOR.
James D. Walker
BY Mann, Brown & Cox
ATTORNEYS.

UNITED STATES PATENT OFFICE 2,391,494

METHOD AND APPARATUS FOR TREATING SEWAGE

James D. Walker, Aurora, Ill., assignor to The American Well Works, Aurora, Ill., a corporation of Illinois Application December 13, 1939, Serial No. 309,049

7 Claims. (Cl. 210—5)

There are two well known methods for the continuous treatment of sewage. One is the trickling filter method, in which the sewage flows through a porous bed at a slow speed and the solid particles gather on the stones or other elements of the bed where they are treated by organisms thereon. Sludge is thus accumulated and is occasionally sloughed off, after which it passes to a settling tank where the sludge settles out and is drawn off at the bottom of the tank. The other method referred to is the aeration process, in which the sewage is treated by mixing it with activated sludge carrying the organisms and by diffusing air through the mixture or by suitably agitating the mixture in the presence of air, or both, the sludge forming in suspension and being carried out to a settling tank where it is settled and drawn off at the bottom of the tank. The activated sludge process, as this process is broadly known, has been generally recognized as more thorough than the trickling filter process. Roughly, it might be stated that the activated sludge process removes up to about 98% of the impurities or solids, while the trickling filter process only removes about 80%. For this and other reasons the activated sludge process has been considered the most desirable where its use is practicable.

The activated sludge process, however, has one serious drawback, which is that it is easily upset by a shock load. The activated sludge process requires a delicate balance. If an activated sludge tank is suddenly subjected to a shock load, either in the nature of greatly increased volume of sewage or a much larger proportion of a type of sewage which is difficult to handle, such as certain industrial wastes, the balance might thrown off completely, with the result that the process would be almost completely disrupted, the sewage flowing out of the tank substantially untreated and carrying off the bacterial agents which are necessary to the process. According to the present invention the advantage of thorough treatment of the activated process is obtained without this disadvantage of being easily upset by combining with the aeration step a preliminary step in which the sewage is treated by the trickling filter process. In spite of this apparent duplication, economy is obtained by making both the trickling filter and the activated sludge tanks smaller than would be necessary if either one were used alone. The trickling filter bed, for example, may have only enough stone or other filtering medium therein to remove about 50% of the organic load or solid matter instead of its possible 80%. The surprising fact is that only one-fifth of the volume of filtering medium is required to remove about 50% of the organic load, and, when this has been removed, less than half of the aeration tank capacity is required, as if the trickling filter had not been used.

Additional objects and advantages of the present invention will be apparent from the following description and from the drawing, in which:

The figure is a diagrammatic representation of one form of apparatus in which this invention might be embodied and in which the process of this invention might be practiced.

A preferred form of the invention has been chosen for illustration and description, in compliance with section 4888 of the Revised Statutes, but persons skilled in the art will readily perceive other means for accomplishing the same results.

In the diagrammatic representation found in the drawing of the embodiment of this invention chosen for illustration, the sewage enters the plant through a pipe represented by the line or arrow 11. According to conventional practice the sewage is first subjected to primary treatment, represented by the tank 12. The primary treatment usually includes screening, and holding the sewage in a quiescent state long enough to settle the solid particles which will settle readily without treatment. Such solid particles, comprising the primary waste sludge, are drawn off at 13 and usually pumped to the digester. The primary treatment may also include other treatments, such as grease removal, but it does not ordinarily include any intensive biological treatment of the sewage. The effluent from which the primary sludge has been removed is drawn off at 14 and flows to the secondary treatment system of the plant. The chief purpose of the secondary treatment is to remove from the liquid the colloidally suspended or dissolved impurities or solid particles which do not settle during the primary treatment. It has been found that the best way of accomplishing this result is to bring the fluid in contact with substances bearing certain living organisms, particularly various kinds of aerobic protozoa and bacteria. As a result of such treatment the minute particles and dissolved impurities are absorbed and removed from the carrying water by the suspended agents and with them form larger masses which are capable of settling out.

According to the present invention the effluent from 14 is first flowed through a trickling filter 16. This trickling filter comprises a tank having therein a filtering medium such as stone to which cling sponge-like or gelatinous growths of bacteria (zoogloea) and other organisms which are vital to the secondary treatment process. Such filters are well known in the industry and need not be described in detail. One form is described in Jenks Patent No. 2,168,208 in conjunction with a recirculating system which need not be used here. Much more detailed information is given in "Sewerage and Sewage Disposal" by Metcalf and Eddy, particularly pages 590 and 603. The effluent from 14 is generally fed to the trickling filter 16 by some means for obtaining a uniform but intermittent distribution, such as a rotating sprinkler 17. As the sewage flows gently through the trickling filter 16, a large proportion of the minute solid particles becomes attached to the growths and, in fact, due to the action of the bacteria, becomes a part of the growths. As the growths are built up, they will occasionally become large enough to slough off and will flow with the sewage through the pipe indicated by the line or arrow 18 to a settling tank 19. Here the sewage is maintained sufficiently quiescent for the growths or sludge to settle out. This sludge is drawn off at 21 and usually taken to the digester while the remaining effluent is drawn off at 22.

According to ordinary uses of trickling filters heretofore this marked the end of the removal of impurities and solid matter from the sewage, the effluent from this settling being run into a stream or lake. Accordingly, it was usually necessary to design the trickling filter to provide enough stone in comparison with the volume of sewage to remove a high percentage of the impurities and solid matter. Even with relatively large and deep trickling filters, only about 80% of the total of the impurities were removed and, accordingly, the aeration or activated sludge process has been used in recent years whenever it was deemed practicable.

According to the present invention the system is intentionally designed with a relatively small amount of stone in the trickling filter so that the effluent drawn off at 22 from the tank 19 may have only about 50% of the total impurities removed therefrom. This permits a greater reduction in the size of the trickling filter than would be supposed from a comparison of the percentages because of the fact that the filter becomes less and less efficient as the removal approaches the 80% point. In short, the relatively small trickling filter contemplated by this invention might be said to be the efficient portion of the filter, while the inefficient portion is omitted.

According to this invention the effluent from the settling tank 19 flows to the aeration or activated sludge tank 23. Here it may be treated according to any of the well known activated sludge or aeration processes, as described, for example, in the Metcalf and Eddy book previously mentioned, particularly beginning at page 636. Both this and the filtering process are also described in "Encyclopaedia Britannica" under "Sewage Disposal." These areation processes are well known and need not be further described here for those who are acquainted with the art of sewage disposal. For the sake of those who are not acquainted with it, however, it may be noted that the aeration or activated sludge processes resemble the filtering process already described with the chief exception that the bacteria growths, here called "flocs," are of a small sponge-like character which, instead of being fixed to the stones of a filter, are carried in suspension in the sewage being treated, and there is a better supply of air than is usually provided with trickling filters. The flocs are kept in suspension by agitation, which also serves to move the flocs through the sewage so that they have repeated intimate contact with all portions thereof. In addition to their biological function or in aid of this function, these sponge-like flocs comprise in effect a filter which is carried through the sewage instead of carrying the sewage through a filter. A large quantity of oxygen is required to support the life of the bacteria and other living organisms comprising the flocs and also to oxidize the nitrites and other material in the sewage. Sometimes air is dispersed at the bottom of the tank to simultaneously supply the oxygen and gently agitate the fluid in the tank. Other times the agitation is of a mechanical type which is designed to either draw air in from the surface or help mix air which is bled into the point of agitation.

As a result of the action in the aeration or activated sludge tank 23, substantially all of the remaining impurities (approximately 95% to 98% of the total originally present in the sewage) are coagulated or absorbed to form flocs which will settle to the bottom when permitted to do so. This is accomplished by flowing the mixture from the aeration tank 23 to a final settling tank 24 where the sewage is maintained in a relatively quiescent state. From this tank the sludge is drawn off at 26, and the final effluent flows off at 27. The final effluent is called the plant effluent and usually flows into a stream or lake, being in the form of a clear and relatively harmless liquid. One advantage of the aeration or activated sludge process is that it even removes most of the pathogenic bacteria originally present in the sewage, but, if conditions so require, the plant effluent may be disinfected.

A portion of the activated sludge which is removed at 26 is returned at 28 to be mixed with the sludge passing from the settling tank 19 to the aeration tank 23, since the presence of a large proportion of this activated sludge is necessary to the activated sludge process. Some of it is preferably also returned at 29 to be mixed with the sludge flowing from the primary treatment unit 12 to the trickling filter 16. It is essential for high speed continuous operation of the activated sludge process to supply activated or return sludge to the aeration tank as shown at 28 since there is nothing to maintain the flocs at a given point and they would otherwise be carried away from the entrance portion of the tank and ultimately from the entire tank. In the case of the trickling filter, however, the biological growths are attached to the stones of the filter and hence would not be carried away. The return of sludge at 29 is therefore optional. It speeds up the initial seeding of a fresh filter and may speed up treatment thereafter. Another advantage is that the activated sludge which is returned at 29 tends to build up the flocs in the trickling filter which break off and produce more sludge in the first settling tank 19 than if sludge were not returned at 29. This sludge is much more dense than the activated sludge from the settling tank 24 and is therefore much more suitable for disposal in the digester. Because of its much smaller water content, it causes much less supernatant liquor from the digester to be displaced back into the treatment system. A flow control box 31 or suitable valves may be provided for regulating the return of the sludge at 28 and at 29. The sludge which is not returned is carried off at 32 in the form of waste sludge, which is usually taken to the digester.

The fact that the biological growths are attached to the filtering medium in the trickling filter 16 but are freely suspended and capable of being washed away in the aeration tank 23 is the key to one of the greatest advantages obtained by combining the trickling filter and the aeration or activated sludge process in the manner described. The activated sludge process requires a delicate balance for greatest efficiency. Shock sewage loads may disrupt this balance to such an extent that the efficiency is very greatly impaired. In effect, the necessary flocs may be largely washed away. The trickling filter, on the other hand, cannot readily be upset since the biological growths are attached to the stones. Accordingly, when any shock load is imposed upon the system at 11, this load is effectively treated by the trickling filter 16, and the variations at 22 will be much smaller in quantity or quality than the variations at 11. In short, the shock nature of the load will be removed so that the sewage can be effectively treated by the aeration tank 23.

In a trickling filter plant the best result expected is the removal of 80% of the impurities. In an activated sludge plant, although 95% to 98% of the impurities would normally be removed, a shock load would so decrease the efficiency as to render the plant entirely unsatisfactory. For this reason activated sludge plants havce been considered impractical under some conditions. According to this invention, however, in which the activated sludge process is preceded by the efficient portion of the trickling filter process, the best results of the activated sludge processes are normally obtained and the complete upsetting of the activated sludge unit is almost entirely prevented. Furthermore, even if the activated sludge unit should be completely upset by even greater shock loads than those for which the system was designed, the plant would not even at that time be completely unsatisfactory inasmuch as the trickling filter would still be removing a large proportion of the impurities.

The fact that the trickling filter would prevent the shock loads for which a given plant is designed from seriously upsetting the aeration unit makes practical the use of this invention under conditions which would otherwise require such a large and expensive aeration unit as to make the aeration or activated sludge process prohibitive in cost.

Even under normal conditions a great saving is effected by this combination of filter and aeration. When a filter is used alone, state boards of health require from 120 to 165 cubic feet of filter media for a given unit of organic sewage load. To remove only 50% of the unit organic load with the filter, only 15 cubic feet of media are required, the filter being much more efficient for the first 50% than later. Although I prefer to use 20 or 30 cubic feet of media per unit load, i. e. per one pound of 5 day B. O. D. (biochemical oxygen demand) per 24 hours, to provide a margin of safety, this is still only ⅛ to ¼ that required for complete treatment by the filter (80% to 85% removal); nor is this gain lost in the aeration tank, for the aeration tank will remove substantially all of the remaining 50% with less than one-half of the volumetric capacity that would be required if the aeration tank were used alone.

It is not necessary to go into the theory which results in this surprising fact. One contributing consideration is that the aeration process appears to remove the last half of the organic load as efficiently as it would the first half and gets the benefit of having half of the work done. It gets a further benefit of having a substantial supply of oxygen already dissolved in the sewage because of passing through the trickling filter. The trickling filter supplies to the activated sludge tank a fresh relatively weak sewage containing a good supply of dissolved oxygen and this is the ideal nature of sewage for the activated sludge process to handle.

One important advantage of this invention is that it lends itself admirably to remedying the defects of an activated sludge plant which is not functioning properly because of overloading or a type of load, such as milk wastes or dye plant wastes, which it cannot well handle. It has been found that usually all that is necessary to make the plant entirely satisfactory is to insert into the system prior to the activated sludge treatment a relatively small trickling filter which converts the system into the plant described in this application even though the activated sludge unit may be larger than would be necessary if full use of the present invention were made.

Since the trickling filter contemplated by this invention is designed to half-treat the sewage and since the volume of sewage may be fairly large, it will usually be preferred to use a trickling filter of a relatively large area and shallow depth. Thus, instead of using the conventional 6 to 10 feet, the trickling filter may be only 3 feet deep. Of course, under special circumstances a greater depth may be desirable.

Although the invention has been described with a settling tank 19 between the trickling filter and the aeration tank, this is not necessary and in some instances has been omitted. As a matter of fact, the sludge which flows from the trickling filter into the activated sludge tank, if no settling tank is used, is useful in the activated sludge process.

Although settling tanks have here been described, it should be understood that any unit for separating the sludge from the effluent could be used. Such a unit might comprise a centrifugal separator or a filter, such as those known as magnetic sand filters.

From the foregoing it is seen that a sewage disposal process and combination apparatus for performing such a process has been devised, which combines exceptionally well the requirements of efficiency, high percentage of removal of impurities, and ability to withstand shock loads.

I claim:
1. The process of treating sewage which includes the steps of flowing the sewage in extensive contact with the air and through a trickling filter, settling the sewage from the trickling filter, removing the settled sludge from the liquid of the sewage, passing this liquid into an activated sludge aeration tank and aerating it by an activated sludge sewage treatment, again removing sludge from the sewage, and returning some of this sludge to the sewage to be treated by the activated sludge treatment.

2. Apparatus for treating sewage, including a tricking filter, an activated sludge aeration tank, aerating means in said tank, means for leading effluent from the tricking filter to the aeration tank, means for removing sludge from the sewage which has been treated in the aeration tank and means for substantially continuously returning sludge from the sludge removing means to the trickling filter and to the aeration tank at will.

3. The process of treating sewage which includes the steps of flowing the sewage in an aerated condition in contact with aerobic bacterial slimes clinging to stationary members, subsequently treating said sewage by an activated sludge process in an aeration tank, separating sludge from the liquid portion of the sewage thus treated, returning some of the sludge to the sewage about to be treated by the activated sludge treatment, returning some of the sludge substantially continuously to the sewage to be treated in contact with said slimes, removing sludge from the sewage between the two treatments and discharging it from the process.

4. Apparatus for treating sewage which includes a tank, stationary members in the tank, means for aerating the sewage and flowing it in aerated condition in contact with aerobic bacterial slimes clinging to said stationary members, an aeration tank for subsequently treating said sewage by an activated sludge process, aerating means in said tank, means for leading sewage from said first named tank to said aeration tank, means for separating sludge from the liquid portion of the sewage thus treated, means for returning some of the sludge to the sewage about to be treated by the activated sludge treatment, and for returning some of the sludge substantially continuously to the sewage to be treated in contact with said slimes and means for removing sludge from the sewage between the two treatments and discharging it from the apparatus.

5. Apparatus for treating sewage, including a trickling filter, an activated sludge aeration tank, aerating means in said tank, means for leading effluent from the trickling filter to the aeration tank, means for removing sludge from the sewage which has been treated in the aeration tank and means for substantially continuously returning sludge from the sludge removing means to the trickling filter and to the aeration tank at will, said apparatus being designed to treat with conventional completeness a given load of sewage and said trickling filter being substantially less than one half the size conventional for treating said load entirely by a trickling filter and said aeration tank having a volumetric capacity approximately as small as one half that conventional for treating said load of sewage entirely by the activated sludge process.

6. Apparatus for treating sewage, designed to treat with conventional completeness a given load of sewage expressed in five-day biochemical oxygen demand for 24 hours, including a trickling filter substantially less than one-half the size conventional for treating said load entirely by a trickling filter, having approximately 15 to 30 cubic feet of filtering media for each pound of said five-day biochemical oxygen demand for 24 hours, means for removing sludge from the trickling filter effluent, and an activated sludge aeration tank having aeration means therein, means for leading the effluent from which the sludge has been removed to the aeration tank to be treated by activated biological agents in suspension therein, said aeration tank having a volumetric capacity of not over approximately one-half that conventional for treating said load of sewage entirely by the activated sludge process.

7. Apparatus for treating sewage, designed to treat with conventional completeness a given load of sewage expressed in five-day biochemical oxygen demand for 24 hours, including a trickling filter substantially less than one-half the size conventional for treating said load entirely by a trickling filter, having not over 30 cubic feet of filtering media for each pound of said five-day biochemical oxygen demand for 24 hours, means for removing sludge from the trickling filter effluent, and an activated sludge aeration tank having aeration means therein, means for leading the effluent from which the sludge has been removed to the aeration tank to be treated by activated biological agents in suspension therein, said aeration tank having a volumetric capacity of not over approximately one-half that conventional for treating said load of sewage entirely by the activated sludge process.

JAMES D. WALKER